United States Patent
Anabarasu et al.

(10) Patent No.: US 10,790,772 B2
(45) Date of Patent: Sep. 29, 2020

(54) POWER SYSTEMS

(71) Applicant: GE Energy Power Conversion Technology Ltd, Rugby, Warwickshire (GB)

(72) Inventors: Aravazhi Anabarasu, Rugby (GB); Ramasamy Anabarasu, Rugby (GB); Martin Butcher, Rugby (GB); Allan Crane, Rugby (GB)

(73) Assignee: GE ENERGY POWER CONVERSION TECHNOLOGY LTD, Warwickshire (GB)

( * ) Notice: Subject to any disclaimer, the term of this patent is extended or adjusted under 35 U.S.C. 154(b) by 0 days.

(21) Appl. No.: 16/267,894

(22) Filed: Feb. 5, 2019

(65) Prior Publication Data
US 2019/0245465 A1    Aug. 8, 2019

(30) Foreign Application Priority Data
Feb. 5, 2018 (EP) .................... 18155043

(51) Int. Cl.
*H02P 9/08* (2006.01)
*H02P 9/00* (2006.01)
(Continued)

(52) U.S. Cl.
CPC ............. *H02P 9/08* (2013.01); *F03D 7/026* (2013.01); *F03D 7/0244* (2013.01); *H02K 7/183* (2013.01);
(Continued)

(58) Field of Classification Search
CPC ...... H02P 3/22; H02P 9/00; H02P 9/08; H02P 2101/15; H02K 7/183; F03D 7/0244; F05B 2270/303
(Continued)

(56) References Cited

U.S. PATENT DOCUMENTS 3,794,898 A * 2/1974 Gross .................. H02P 3/22
                                                  318/380
3,961,688 A * 6/1976 Maynard .............. B66B 5/02
                                                  187/289
(Continued)

FOREIGN PATENT DOCUMENTS

DE    10105892 A1    9/2002
EP    3012961 A2    4/2016
(Continued)

OTHER PUBLICATIONS

European Search Report and Written Opinion dated Jun. 19, 2018 which was issued in connection with EP18155043.5 which was filed on Feb. 5, 2018.

*Primary Examiner* — Pedro J Cuevas
(74) *Attorney, Agent, or Firm* — Wood IP LLC

(57) ABSTRACT

A method of controlling a power system that includes an electrical machine, e.g., wind turbine generator, a power converter, a DC circuit and a dynamic braking system (DBS) having a braking circuit having a braking resistor and being connected in series to the DC circuit, is provided. The method includes operating the DBS and controlling operation of the electrical machine based on a prevailing temperature of the braking circuit, stopping the electrical machine and controlling the electrical machine to be restarted at its rated output power once the prevailing temperature of the braking resistor reaches or falls below a lower temperature threshold. The electrical machine may be restarted at a lower output power and after restarting, its output power can be increased based on a power starting profile as the braking resistor cools.

14 Claims, 6 Drawing Sheets

(51) Int. Cl.
*H02P 3/22* (2006.01)
*F03D 7/02* (2006.01)
*H02K 7/18* (2006.01)
*H02M 7/04* (2006.01)
*H02P 9/02* (2006.01)
*H02P 101/15* (2016.01)

(52) U.S. Cl.
CPC ............... *H02M 7/04* (2013.01); *H02P 3/22* (2013.01); *H02P 9/00* (2013.01); *H02P 9/02* (2013.01); *F05B 2270/1011* (2013.01); *F05B 2270/303* (2013.01); *F05B 2270/327* (2013.01); *H02P 2101/15* (2015.01)

(58) Field of Classification Search
USPC ...................................................... 290/44, 55
See application file for complete search history.

(56) References Cited

U.S. PATENT DOCUMENTS

| | | | | |
|---|---|---|---|---|
| 4,203,058 A * | 5/1980 | Chen | ................... | H02H 7/0811 318/380 |
| 6,301,531 B1 * | 10/2001 | Pierro | ................. | B61L 27/0094 701/31.4 |
| 7,812,555 B2 * | 10/2010 | Adra | ....................... | B60L 50/11 318/376 |
| 8,078,376 B2 * | 12/2011 | Kumar | ................... | B60T 17/228 303/122 |
| 8,112,191 B2 * | 2/2012 | Kumar | ................... | B60L 50/61 701/22 |
| 8,180,544 B2 * | 5/2012 | Noffsinger | ................ | B60L 7/16 303/167 |
| 8,248,005 B2 * | 8/2012 | Romer | ...................... | H02P 3/12 318/380 |
| 8,504,272 B2 * | 8/2013 | Kumar | .................. | B60T 17/228 303/122 |
| 9,013,123 B2 * | 4/2015 | Innes | ........................ | H02P 3/22 318/87 |
| 9,950,722 B2 * | 4/2018 | Kumar | ................ | B61L 27/0027 |
| 10,054,640 B2 * | 8/2018 | Saito | .................. | G01R 31/3278 |
| 2008/0288192 A1 * | 11/2008 | Kumar | .................... | B60L 50/61 702/60 |
| 2009/0079193 A1 | 3/2009 | Nielsen et al. | | |
| 2009/0125170 A1 * | 5/2009 | Noffsinger | ................ | B60L 7/16 701/20 |
| 2013/0133480 A1 * | 5/2013 | Donnelly | ................. | B60K 6/36 74/720 |
| 2014/0001987 A1 * | 1/2014 | Okada | ....................... | B60L 7/16 318/370 |
| 2014/0313621 A1 * | 10/2014 | Innes | ................... | H02H 7/0833 361/24 |
| 2017/0016958 A1 * | 1/2017 | Saito | ........................ | H02P 3/22 |
| 2020/0059172 A1 * | 2/2020 | Benarous | ............. | F16D 63/002 |

FOREIGN PATENT DOCUMENTS

| | | |
|---|---|---|
| WO | 2011095169 A2 | 8/2011 |
| WO | 2014194464 A1 | 12/2014 |
| WO | 2017194196 A1 | 11/2017 |

* cited by examiner

POWER SYSTEMS

TECHNICAL FIELD

The present invention relates to power systems that include a dynamic braking system (or DBS), and in particular a DBS that includes at least one braking circuit connected to a direct current (DC) circuit for dissipating excess energy as heat.

BACKGROUND OF THE DISCLOSURE

A power system 1 with a dynamic braking system (or DBS) is shown in FIG. 1. The DBS includes a braking circuit 2 connected to a DC circuit 4 of the power system 1.

The DC circuit 4 is connected to the DC terminals of an AC/DC power converter 6, e.g., a multi-level converter. The AC terminals of the AC/DC power converter 6 are connected to an electrical machine, in this case a wind turbine generator 8. The rotor of the wind turbine generator 8 is driven to rotate by a rotor assembly 10 including one or more rotor blades. Although not shown in FIG. 1, the DC circuit 4 is normally also connected to the DC terminals of a power converter. The power converter can be a DC/AC power converter, e.g., a multi-level converter, with AC terminals that are connected to an AC power network or grid, for example. The power converter can also be a DC/DC power converter with other DC terminals that are connected to a DC power network or grid, for example. The DC circuit can also form part of a DC power network or grid. The DC circuit 4 can be a DC link between the two or more closely-coupled power converters. During normal operation, power generated by the wind turbine generator 8 is supplied to the DC circuit 4 through the AC/DC power converter 6 operating as an active rectifier. Power can then be supplied from the DC circuit to the AC power network or grid through the DC/AC power converter operating as an inverter, or to the DC power network or grid through the DC/DC power converter or directly.

The DBS can be operated to dissipate any excess energy in the DC circuit 4 that may result during normal operation of the wind turbine generator 8, e.g., to keep turbine speed within its allowed limit, or during a fault in the power system or the connected power network or grid.

The power system can include a second AC/DC power converter whose AC terminals are connected to the wind turbine generator 8 in parallel with the above-mentioned AC/DC power converter, and whose DC terminals are connected to a second DC circuit. Two or more braking circuits 2 can be connected to each DC circuit 4 with each braking circuit being adapted to dissipate a proportion of the excess energy in the DC circuit. FIG. 3 shows a practical arrangement of a power system 1' where the wind turbine generator 8 is connected to an AC power network or grid 12 by two or more power converter assemblies (or "channels") 14a, . . . 14n arranged in parallel. Each power converter assembly 14a, . . . 14n includes an AC/DC power converter 16 whose AC terminals are connected to the wind turbine generator 8, a DC circuit 18, and a DC/AC power converter 20 whose AC terminals are connected to the AC power network or grid 12. The DC circuit 18 of each power converter assembly 14a, . . . 14n is a DC link between the two closely-coupled AC/DC and DC/AC power converters 16, 20. During normal operation, power generated by the wind turbine generator 8 is supplied to the DC circuit 16 of each power converter assembly 14a, . . . 14n through the respective AC/DC power converter 16 operating as an active rectifier and power is supplied from the DC circuit to the AC power network or grid 12 through the respective DC/AC power converter 20 operating as an inverter.

The DBS includes two braking circuits per power converter assembly 14a, . . . 14n. In particular, as shown in FIG. 3, two braking circuits 2a, 2b are connected in series to the DC circuit 18 of the first power converter assembly 14a and two braking circuits 2c, 2d are connected in series to the DC circuit of the nth power converter assembly 14n. It will be readily appreciated that the power system 1' can have any suitable number of power converter assemblies arranged in parallel (i.e., any suitable number of "channels") depending on the power design requirements, and that any suitable number of braking circuits can be connected to the DC circuit of each power converter assembly. If two or more braking circuits are connected to the same DC circuit they will dissipate a proportion of the excess energy in the DC circuit. If the power system has two or more parallel power converter assemblies (or "channels"), the excess energy in each DC circuit will be a proportion of the output power of the wind turbine generator 8. For example, if there are three power converter assemblies for the arrangement shown in FIG. 3 (i.e., n=3) there will be a total of six braking circuits. If the braking circuits are substantially identical, each braking circuit will dissipate approximately one sixth (⅙th) of the power output by the wind turbine generator 8 when the DBS is operated and must be rated accordingly.

As shown in FIG. 2, each braking circuit 2 includes a series-connected braking resistor 22 and a chopper 24 (e.g., a fully-controllable semiconductor switch such as an IGBT) that is controlled to be switched on and off by a gate drive circuit (not shown) under the control of a control unit 26. If the DBS has two or more braking circuits, either connected to the same DC circuit or to separate DC circuits, the choppers are switched on and off substantially simultaneously so that the individual braking circuits are operated in a coordinated manner to dissipate energy in the DC circuit(s). The control unit 26 can be part of a control unit for the power system, which can also control operation of the wind turbine generator, the power converters etc. Each braking circuit 2 can also include a recovery diode 28 to dissipate energy stored in the braking circuit inductance. It should be understood that FIG. 2 shows a functional equivalent braking circuit and that the inductance can be representative of parasitic and/or intentional inductances. Any suitable braking circuit topology can be used as long as it includes a braking resistor and a chopper.

When the chopper 24 of each braking circuit 2 is switched on, excess energy in the connected DC circuit 4 is directed to the braking resistor 22 where it is dissipated as heat. Each braking resistor 22 can have any suitable construction.

The DBS can be operated automatically if the voltage in the DC circuit (or one of the DC circuits) exceeds a threshold, or if there is a voltage unbalance in the DC circuit (or one of the DC circuits). During the operation of the DBS, the chopper 24 of each braking circuit 2 can be switched on continuously, but it is more commonly switched on and off by the control unit 26 according to a duty cycle which determines the energy dissipation.

In the event of a fault in the power network or grid, the output power of the connected wind turbine generator 8 cannot be supplied to the power network. The rotor assembly 10 cannot be immediately brought to stop by mechanical means (e.g., a mechanical brake) and the DBS must be capable of dissipating at least the whole of the rated output power of the wind turbine generator 8 for a period of time while the wind turbine generator 8 is controlled to reduce its rotational speed to a complete stop. Such a "worst case" situation might be based on an output power that is higher than the rated output power of the wind turbine generator 8 in case the wind speed is increasing rapidly at the same time as the fault occurs on the power network or grid. The DBS dissipates energy generated by the wind turbine generator 8 as its rotational speed is reduced to zero.

The DBS can only be operated for a certain continuous period of time (the "operation time") to prevent its components from being damaged. The operation time is typically a fixed time period, e.g., 9 seconds. It will be readily appreciated that energy is not necessarily being continuously dissipated in the braking resistor 22 of each braking circuit 2 during the operation time if the chopper 24 is being switched on and off according to a duty cycle.

Once the operation of the DBS has ended, the wind turbine generator 8 normally remains stopped for a certain period of time (the "recovery time") to allow the DBS to recover so that it is capable of being activated again during another "worst case" situation where at least the whole of the rated output power of the generator must be dissipated. The recovery time is typically a fixed time period, e.g., 20 minutes. During the recovery time, the wind turbine generator 8 is not able to generate power and therefore cannot generate any income for its operator.

If an electrical machine is normally used for motoring applications, e.g., it is a variable speed motor for driving equipment, it is sometimes necessary to use a DBS to dissipate excess energy as heat when the electrical machine is occasionally operated as a generator or in a regenerative mode, for example during regenerative braking or with an overhauling load. Such variable speed motors can be used in a wide variety of different technical fields such as oil and gas, locomotion, marine etc. Equipment driven by the rotor can include pumps, compressors, fans, drilling equipment, winches, marine propulsion assemblies etc. A power system 1'' including a variable speed motor 50 and a DBS is shown in FIG. 9. The DBS includes a braking circuit 44 connected to a DC circuit 46. As shown in FIG. 2, each braking circuit 44 includes a series-connected braking resistor 22 and a chopper 24 (e.g., a fully-controllable semiconductor switch such as an IGBT) that is controlled to be switched on and off by a gate drive circuit (not shown) under the control of a control unit 56.

The DC circuit 46 is connected to the DC terminals of a DC/AC power converter 48, e.g., a multi-level converter. The AC terminals of the DC/AC power converter 48 are connected to an electrical machine, in this case a variable speed motor 50. The rotor of the variable speed motor 50 is connected to equipment, e.g., a pump, compressor, fan, drilling equipment, winch, marine propulsion assembly etc. The DC circuit 46 is also connected to an AC/DC power converter 52, e.g., a multi-level converter, with AC terminals that are connected to an AC power network or grid 54. During normal operation, power is supplied from the AC power network or grid 54 to the DC circuit 46 through the AC/DC power converter 52 operating as an active rectifier and from the DC circuit to the variable speed motor 50 through the DC/AC power converter 48 operating as an inverter. The power converters 48, 52 and the DC circuit 46 together define a variable speed drive (or VSD). The power flow through the VSD to the variable speed motor 50 is varied by a controller 58 which controls the operation of the individual power converters, and in particular the switching of the various semiconductor switches. Varying the input power allows the rotational speed of the motor 50 to be controlled.

During reverse operation, power being generated by the variable speed motor 50 (e.g., by regenerative braking) is supplied to the DC circuit 46 through the DC/AC power converter 48 operating as an active rectifier. The generated power can be supplied to the AC power network or grid 54 and/or dissipated as heat in the braking resistor 22 of the DBS. The generated power can only be supplied to the power AC network or grid 54 if the DC circuit 46 is connected to it by a power converter that is capable of bidirectional power flow, e.g., the AC/DC power converter 52 that can be operated as an active rectifier during motoring applications and as an inverter during generating applications. If the grid-side power converter is only capable of unidirectional flow, e.g., it is a diode bridge, the excess energy will be dissipated in the DBS.

Once the operation of the DBS has ended, the variable speed motor 50 may need to be stopped or its rotational speed might need to be controlled while operating as a motor to allow the DBS to recover so that it is capable of being activated again, for example during a subsequently period of generative braking.

BRIEF DESCRIPTION OF THE DISCLOSURE

In one arrangement, the present invention aims to improve on the fixed operation and recovery times for wind turbine generators mentioned above. In particular, the invention provides a method of controlling a power system, and a power system, where at least the recovery time for restarting the electrical machine (e.g., a wind turbine generator) is not fixed but is determined dynamically with reference to a prevailing temperature of a braking circuit of the DBS. The operation time can also be determined dynamically with reference to a prevailing temperature of the braking circuit of the DBS.

The present invention also aims to provide improved control for electrical machines such as variable speed motors that are normally operated in a motoring mode but where excess power is dissipated as heat in a DBS during regenerative braking or with an overhauling load, for example.

The invention provides a method of controlling a power system comprising an electrical machine (e.g., a motor or generator), a power converter including AC terminals connected to the electrical machine and DC terminals, a DC circuit connected to the DC terminals of the power converter, and a dynamic braking system (or DBS) comprising a braking circuit connected in series to the DC circuit, the braking circuit including a braking resistor and a chopper; the method including operating the DBS; and controlling operation of the electrical machine based on a prevailing temperature of the braking circuit.

Controlling operation of the electrical machine can include controlling one or more of its operating parameters such as its torque, rotational speed etc. with reference to a prevailing temperature of the braking circuit. The DBS will normally be operated while the electrical machine is operating in a generating mode (e.g., when generating power during normal operation if the electrical machine is a wind turbine generator, or during regenerative braking if the electrical machine is a variable speed motor that normally operates in a motoring mode). The electrical machine can be controlled while the electrical machine is operating in a generating mode or subsequently operating in a motoring mode (e.g., if the electrical machine is a variable speed drive).

The method can further include the step of stopping operation of the electrical machine, and the controlling step can include controlling the restarting of the electrical machine based on a prevailing temperature of the braking circuit. This control is particularly appropriate if the electrical machine is a wind turbine generator, for example.

The invention further provides a power system comprising:

a. an electrical machine (e.g., a motor or generator);

b. a power converter including AC terminals connected to the electrical machine and DC terminals;

c. a DC circuit connected to the DC terminals of the power converter;

d. a DBS comprising a braking circuit connected in series to the DC circuit, the braking circuit including a braking resistor and a chopper; and e. a control unit adapted to operate the DBS and control operation of the electrical machine based on a prevailing temperature of the braking circuit.

The control unit can be adapted to control one or more of the operating parameters of the electrical machine such as its torque, rotational speed, power etc. with reference to a prevailing temperature of the braking circuit. The DBS will normally be operated while the electrical machine is operating in a generating mode (e.g., when generating power during normal operation if the electrical machine is a wind turbine generator, or during regenerative braking if the electrical machine is a variable speed drive). The control unit can be adapted to control the electrical machine while the electrical machine is operating in a generating mode or subsequently operating in a motoring mode (e.g., if the electrical machine is a variable speed drive).

The control unit can be further adapted to stop operation of the electrical machine, and to control the restarting of the electrical machine based on a prevailing temperature of the braking circuit. This control is particularly appropriate if the electrical machine is a wind turbine generator, for example.

The control unit can be further adapted to carry out the steps described below.

The electrical machine can have any suitable construction. In one arrangement, the electrical machine is a wind turbine generator whose rotor is driven to rotate by a rotor assembly including one or more rotor blades, or more generally a renewal energy generator whose rotor is driven to rotate by renewal energy such as tidal energy, sea currents or wind, for example. In another arrangement, the electrical machine is a variable speed motor that can be used to drive suitable load equipment or a drive shaft, for example.

The power converter can have any suitable construction. In one arrangement, the power converter is an AC/DC power converter with a plurality of controllable semiconductor switches. The power converter can function as part of a drive if the electrical machine is a variable speed motor. The power converter will be capable of bidirectional power flow to allow power generated by the variable speed motor when operating in a generating mode (e.g., during generative braking) to be supplied to the DC circuit and dissipated as heat in the DBS.

The power system can further include a second power converter including DC terminals connected to the DC circuit and AC terminals connectable to an AC power network or grid. In one arrangement, the second power converter is a DC/AC power converter with a plurality of controllable semiconductor switches. The second power converter can be a DC/DC power converter including first DC terminals connected to the DC circuit and second DC terminals connectable to a DC power network or grid. The DC circuit can form part of a DC power network or grid. The closely-coupled power converters and the DC circuit (or DC link) can define a power converter assembly that connects the electrical machine to the power network or grid. The power system can include two or more power converter assemblies arranged in parallel. The DC circuit of each power converter assembly can be connected to a braking circuit, or connected to two or more braking circuits of the DBS that are operated in a coordinated manner to dissipate energy in the DC circuit.

If two or more braking circuits are connected to the same DC circuit, the braking circuits can be connected in series between the DC rails of the DC circuit.

The chopper and the braking resistor of each braking circuit are connected in series. The chopper can be a fully-controllable semiconductor switch such as an IGBT or similar. The braking circuit can have any suitable topology and can include other components in addition to the chopper and braking resistor as appropriate. The braking resistor can have any suitable mechanical construction and is normally designed with appropriate characteristics (e.g., ohmic value) to meet the power system requirements.

In one arrangement, the DBS can be operated at the same time as the electrical machine is controlled or at the same time as the stopping operation of the electrical machine. In general terms, there will normally be at least some overlap between the two operations. The stopping of the electrical machine can follow a power shedding profile which in practice can be based on a combination of dissipating energy in the DBS and appropriate control of the electrical machine to reduce its rotational speed. For example, in the case of a wind turbine generator, the appropriate control might include blade pitch control to adjust the pitch angle of each rotor blade and/or the application of a mechanical brake. The improved operation of the DBS provided by the present invention can reduce or delay the need to mechanically control the wind turbine generator, thereby significantly reducing mechanical stress on the rotor blades, blade pitch systems etc. In one arrangement, the electrical machine can be controlled subsequent to the DBS being operated. In the case of a variable speed drive, the appropriate control might be to operate it at a lower rotational speed in a motoring application after the DBS has been operated.

The DBS can be operated for a certain period of time (the "operation time"). During the operation time, the chopper can be switched on continuously or switched on and off by a control unit according to a duty cycle.

The maximum operation time of the DBS can be a fixed time period such as 9 seconds in the case of a wind turbine generator, for example, or several minutes in the case of a variable speed motor that is providing regenerative braking.

Alternatively, the maximum operation time of the DBS can be a variable time period that is determined dynamically based on a prevailing temperature of the braking circuit. For example, the maximum operation time can be determined based on the prevailing temperature of one or both of the chopper and the braking resistor. The maximum operation time of the DBS can be the time taken for the chopper or the braking resistor to reach or exceed a respective upper temperature threshold. The respective upper temperature threshold can be selected to be the maximum rated temperature of the particular component, e.g., as determined by the manufacturer datasheet. But the upper temperature threshold can also be selected to be lower than the maximum rated temperature of the particular component so that the operation of the DBS is ended before the maximum rated temperature is reached. This provides a thermal margin.

The prevailing temperature of the chopper can be measured directly using a suitable sensor. But often the prevailing temperature of the chopper will be estimated accurately using a thermal model with one or more input parameters. Input parameters might include the power loss in the chopper, a measured ambient temperature, a measured temperature of any housing or casing for the chopper etc. The output of the thermal model will be an estimated temperature of the chopper.

Similarly, the prevailing temperature of the braking resistor can be measured directly using a suitable sensor. But often the prevailing temperature of the braking resistor will be estimated accurately using a thermal model with one or more input parameters. Input parameters might include the power loss in the braking resistor (optionally calculated by ignoring any inductance or reverse recovery effects), a measured ambient temperature etc. The output of the thermal model will be an estimated temperature of the braking resistor.

The temperature measurements or estimates are provided to the control unit.

Other ways of deriving the prevailing temperature of the chopper and the braking resistor can also be used.

Once the operation of the DBS has started, the prevailing temperature of the chopper (i.e., as measured, estimated using a thermal model or otherwise derived) can be compared in "real time" against an upper temperature threshold for the chopper. Similarly, the prevailing temperature of the braking resistor (i.e., as measured, estimated using a thermal model or otherwise derived) can be compared in "real time" against an upper temperature threshold for the braking resistor. If either of the prevailing temperatures reaches or exceeds the respective upper temperature threshold, the operation of the DBS can be ended by the control unit. The comparisons can be carried out by the control unit and the upper temperature thresholds can be pre-determined or pre-selected.

If the DBS has two or more braking circuits, operation of the DBS can be ended when the prevailing temperature of one of the braking circuits reaches or exceeds an upper temperature threshold.

This improved method of determining the maximum operation time will often allow the DBS to be operated safely for longer than has previously been the case, i.e., when using a fixed operation time. A longer maximum operation time for the DBR can reduce or delay the need to control the actual electrical machine. In other words, in the case of a wind turbine generator, if the DBS is still capable of dissipating energy on the basis of the "real time" temperature comparisons described above, the power shedding profile can prioritise the use of the DBS and delay blade pitch control or other stopping operation, for example. It can also lead to significant cost savings because there is no need, as a precaution, to over-rate the components of the DBS since operation time is determined dynamically and with regard to specific temperature measurements, specific input parameters for the thermal models etc.

In a first method, the controlling step can include restarting the stopped electrical machine when a prevailing temperature of the braking circuit reaches or falls below a lower temperature threshold. Such control can be particularly useful for a wind turbine generator which must be stopped if there is a fault in the power network or grid that prevents the export of power. But such control can also be useful for other electrical machines, including variable speed motors, which might also need to be stopped as a result of the DBS being operated or for any other reason. A minimum "recovery time" can be determined dynamically based on the prevailing temperature of the braking resistor (i.e., as measured, estimated using a thermal model or otherwise derived) which is compared in "real time" against a lower temperature threshold for the braking resistor. In other words, the minimum recovery time during which the electrical machine must remain stopped does not need to be a fixed time period such as 20 minutes in the case of a wind turbine generator, for example, but can be determined by the time taken for the braking resistor to reach or fall below a lower temperature threshold. In practice, the method will normally only take into account the prevailing temperature of the braking resistor because it has been found to cool down at a much slower rate than the chopper and therefore represents the limiting factor in the thermal recovery of the braking circuit. But it is also possible, additionally or alternatively, to compare the prevailing temperature of the chopper against a lower temperature threshold for the chopper. The comparison(s) can be carried out by the control unit and the lower temperature threshold(s) can be pre-determined or pre-selected.

When the prevailing temperature of the braking circuit (or braking resistor, more particularly) reaches or falls below the lower temperature threshold, the electrical machine can be restarted by the control unit. The electrical machine can be restarted according to a normal starting sequence. For example, in the case of a wind turbine generator, the rotor assembly is released and the output power of the wind turbine generator can be ramped up to the rated output power under appropriate control. In the case of a variable speed motor, the input power supplied to the motor can be ramped up to the appropriate level under appropriate control to achieve the desired rotational speed.

The lower temperature threshold of the braking circuit can be selected so that, once this temperature is reached or exceeded, the DBS can be operated safely for a "worst case" situation. In other words, at the lower temperature threshold, the braking resistor has cooled sufficiently to be able to withstand the temperature increase if the DBS has to be operated again for the required time, for example to dissipate a pre-determined output power of the electrical machine. This can be the output power of the electrical machine that would need to be dissipated if a variable speed motor was to be operated in a generating mode to provide regenerative braking, for example. The pre-determined output power is at least the rated output power of the electrical machine and can be higher than the rated output power. If the DBS has two or more braking circuits, each braking circuit will be adapted to dissipate a proportion of the pre-determined output power and the lower temperature threshold of each braking circuit can be selected accordingly.

If the DBS has two or more braking circuits, the electrical machine can be restarted when a prevailing temperature of all of the braking circuits reaches or falls below a lower temperature threshold.

This improved method of determining the minimum recovery time will often allow the electrical machine to be restarted earlier than has previously been the case, i.e., with a fixed recovery time. The minimum recovery time might sometimes be longer than the previous fixed recovery time. But in this case the method avoids a potentially dangerous situation where the electrical machine is restarted too soon without dynamic braking capability.

In a second method, the controlling step can include restarting the stopped electrical machine and, after restarting, varying a maximum output power of the electrical machine based on the prevailing temperature of the braking resistor. The controlling step can alternatively include varying one or more of the operating parameters of the restarted electrical machine (e.g., torque, rotational speed, power etc.) during a subsequent motoring operation based on the prevailing temperature of the braking resistor. In practice, the method will normally only take into account the prevailing temperature of the braking resistor because it has been found to cool down at a much slower rate than the chopper and therefore represents the limiting factor in the thermal recovery of the braking circuit. But it is also possible, additionally or alternatively, to vary a maximum output power or vary one or more of the operating parameters of the electrical machine based on the prevailing temperature of the chopper.

In the case of a wind turbine generator, the maximum output power can be varied using a power reference, for example. It will be readily appreciated that in practice the actual power that the electrical machine outputs can be less than the maximum output power depending on the particular operating conditions, e.g., wind speed in the case of a wind turbine generator. But the power reference defines a maximum output power that cannot be exceeded and the electrical machine is controlled accordingly.

The electrical machine may only need to be stopped for a short period of time—e.g., to allow for fault clearance on the power network or grid. This is likely to be much shorter than a conventional fixed recovery time or even the minimum recovery time determined dynamically in accordance with the first method. It typically takes 2-3 minutes to restart a wind turbine generator after a fault has been cleared. Instead of waiting until the braking resistor has cooled sufficiently to be able to withstand the temperature increase caused by the subsequent operation of the DBS with the electrical machine operating at its rated output power, i.e., the "worst case" situation outlined above, the electrical machine can be restarted much earlier but at a lower output power that can be increased as the braking resistor continues to cool. At any time after the electrical machine has been restarted, the DBS can be operated safely because the braking resistor is able to withstand the maximum temperature increase that would arise from dissipating the actual output power of the electrical machine as determined by the power reference. If the DBS has two or more braking circuits, each braking circuit will be adapted to dissipate a proportion of the actual output power and the maximum output power of the electrical machine can be selected accordingly.

The prevailing temperature of the braking resistor can be measured, estimated using a thermal model, or otherwise derived as described in more detail above.

The maximum output power of the electrical machine can be determined using a power starting profile that relates output power to temperature or temperature difference. A temperature difference can be determined by subtracting the prevailing temperature of the braking resistor (e.g., as measured, estimated or otherwise derived) from an upper temperature threshold of the braking resistor. This temperature difference can then be used to select an appropriate power reference for the electrical machine. The upper temperature threshold can be the rated temperature of the braking resistor, for example. The upper temperature threshold for determining the temperature difference can be the same as the upper temperature threshold for determining the maximum operation time of the braking circuit in the operating step. Alternatively, different upper temperature thresholds can be used, for example if one or both of the upper temperature thresholds for the braking resistor are selected to be below the rated temperature to provide a thermal margin.

If the DBS has two or more braking circuits, each having a respective temperature or temperature difference, the power starting profile can use one of the temperatures or temperature differences to select the power reference.

An initial maximum output power can be selected on restarting the electrical machine. The maximum output power can then be increased according to the power starting profile as the braking resistor cools and the temperature difference increases until the maximum output power equals the rated output power for the electrical machine.

The duty cycle of the braking resistor and its effect on power dissipation can be taken into account when determining the maximum output power of the electrical machine. The duty cycle can be fixed or variable.

In the case of a variable speed motor, its operation can be controlled using a control reference that can be used to control or vary the input power supplied through the power converter to the motor, for example. The control reference can be a speed, torque or power reference, for example, which can be used to determine one or more operating parameters for the variable speed motor. The control reference can be provided to the power converter or its controller where it can be used as part of a control strategy to vary the input power to the motor by controlling the semiconductor switches. Such control strategies are well known to the skilled person and might, for example, use pulse width modulation (PWM) or any other appropriate control.

The prevailing temperature of the braking resistor can be measured, estimated using a thermal model, or otherwise derived as described in more detail above. The maximum rotational speed of the electrical machine can be determined using a speed or torque profile that relates rotational speed or torque to temperature or temperature difference. A temperature difference can be determined by subtracting the prevailing temperature of the braking resistor (e.g., as measured, estimated or otherwise derived) from an upper temperature threshold of the braking resistor. This temperature difference can then be used to select an appropriate speed or torque reference for controlling operation of the electrical machine. Other control profiles can be used. The upper temperature threshold can be the rated temperature of the braking resistor, for example. The upper temperature threshold for determining the temperature difference can be the same as the upper temperature threshold for determining the maximum operation time of the braking circuit in the operating step. Alternatively, different upper temperature thresholds can be used, for example if one or both of the upper temperature thresholds for the braking resistor are selected to be below the rated temperature to provide a thermal margin.

If the DBS has two or more braking circuits, each having a respective temperature or temperature difference, the speed or torque profile can use one of the temperatures or temperature differences to select the control reference.

The duty cycle of the braking resistor and its effect on power dissipation can be taken into account when determining the control reference. The duty cycle can be fixed or variable.

The invention further provides a method of controlling a power system comprising an electrical machine (e.g., a motor or generator), a power converter including AC terminals connected to the electrical machine and DC terminals, a DC circuit connected to the DC terminals of the power converter, and a DBS comprising a braking circuit connected in series to the DC circuit, the braking circuit including a braking resistor and a chopper;

a. the method including operating the DBS until the prevailing temperature of the braking circuit reaches or exceeds an upper temperature threshold, e.g., the rated temperature of the braking resistor or the chopper.

The invention further provides a power system comprising:
    a. an electrical machine (e.g., a motor or generator);
    b. a power converter including AC terminals connected to the electrical machine and DC terminals;
    c. a DC circuit connected to the DC terminals of the power converter;
    d. a DBS comprising a braking circuit connected in series to the DC circuit, the braking circuit including a braking resistor and a chopper; and
    e. a control unit adapted to operating the DBS until the prevailing temperature of the braking circuit reaches or exceeds an upper temperature threshold, e.g., the rated temperature of the braking resistor or the chopper.

The control unit can be further adapted to carry out the steps described above.

DETAILED DESCRIPTION

Figure 1:
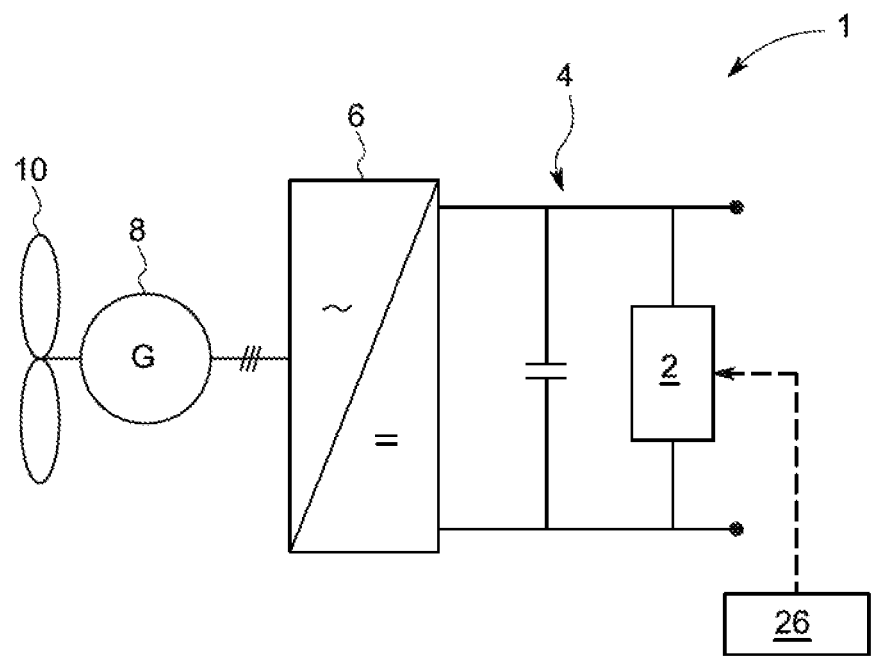
FIG. 1 shows a power system with a wind turbine generator and a DBS having one braking circuit.
Figure 2:
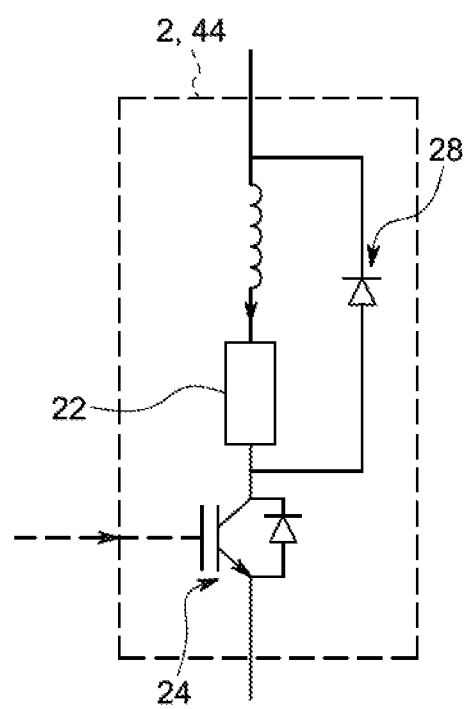
FIG. 2 shows a braking circuit.
Figure 3:
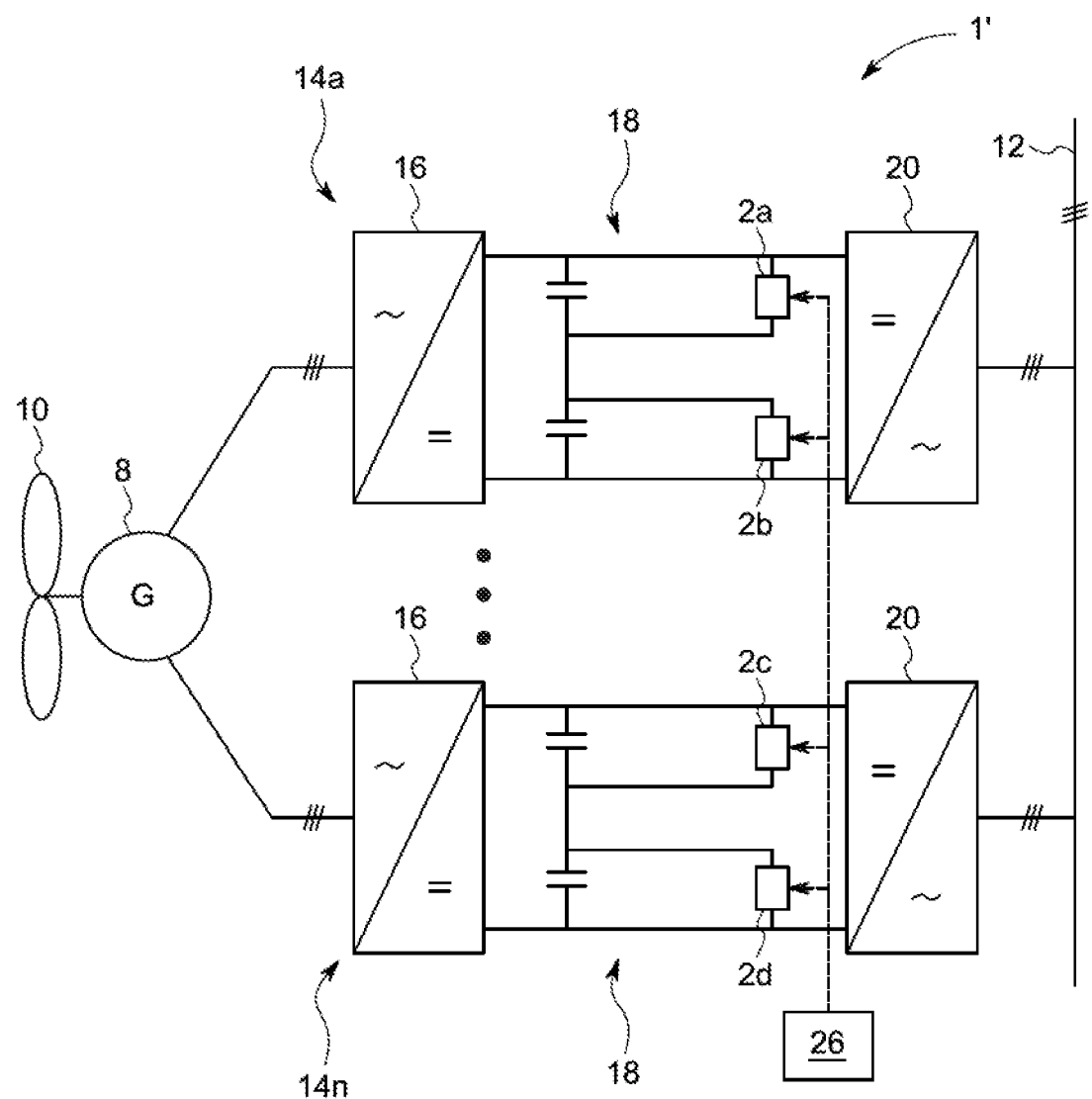
FIG. 3 shows an alternative power system with a wind turbine generator, multiple "channels" and a DBS having two braking circuits per "channel"

The present invention provides a method of controlling the power systems 1 and 1' shown in FIGS. 1 to 3.

Unless otherwise stated, the following description assumes that the DBS has a single braking circuit. But commentary is provided to explain how the method can be adapted for a DBS with two or more braking circuits.

Figure 4:
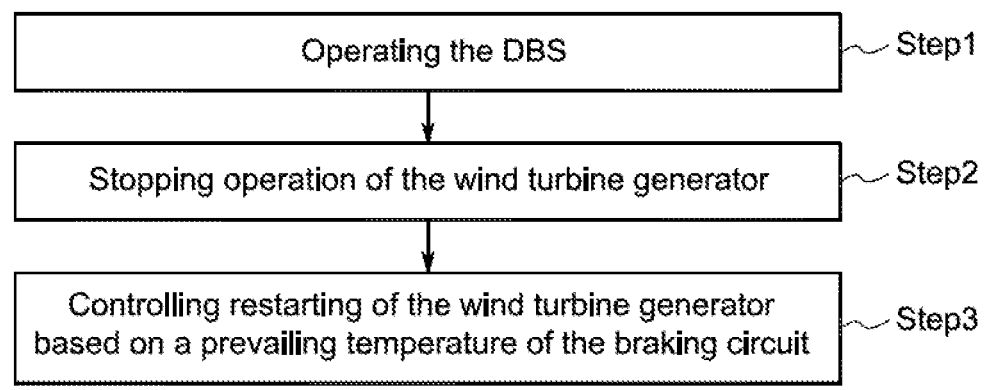
FIG. 4 shows the steps of a method according to the present invention for controlling a wind turbine generator.

With reference to FIG. 4, in the event of a fault which prevents power generated by the wind turbine generator 8 from being supplied to the power network or grid 12, e.g., during a low voltage dip, the method includes the following steps:

Step 1: Operating the dynamic braking system (or DBS), e.g., by switching the chopper 24 on and off according to a duty cycle, so that the excess energy in the DC circuit 4 which cannot be supplied to the power network or grid 12 because of the fault is dissipated as heat in the braking resistor 22.

Step 2: Stopping operation of the wind turbine generator 8, e.g., using blade pitch control and/or applying mechanical braking of the blade assembly 10, to bring the wind turbine generator to a complete stop until the fault is cleared. (It will be readily understood that the operations in Steps 1 and 2 will normally overlap and that the stopping of the wind turbine generator 8 can follow a power shedding profile which in practice can be based on a combination of dissipating energy in the DBS and appropriate control to reduce the rotational speed of the wind turbine generator. To this extent, the operations in Step 1 and 2 can be viewed as being part of a single, coordinated, step for controlling the dissipation of excess energy during a fault condition.)

Step 3: Controlling the restarting of the wind turbine generator 8 based on a prevailing temperature of the braking circuit 2.

Maximum Operation Time

In Step 1, the DBS is operated for a period of time (the "operation time").

Figure 5:
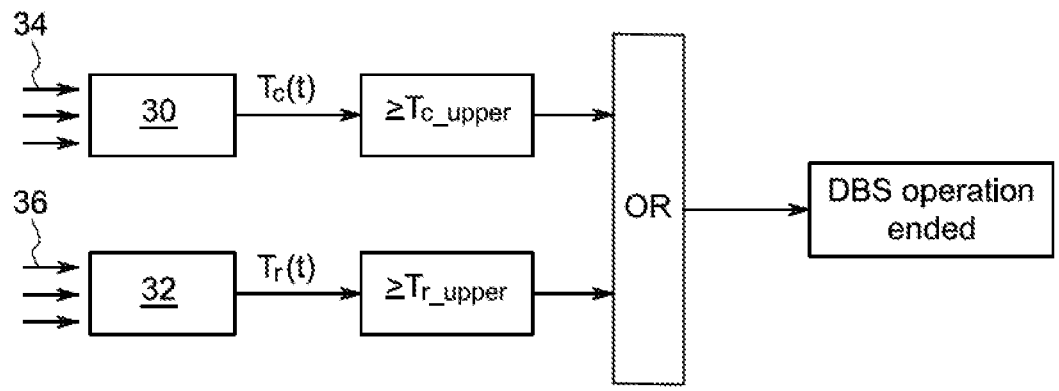
FIG. 5 shows an example of how the maximum operation time of the DBS can be determined.

If the DBS is operated for too long, it can result in component failure or, in some cases, the destruction of the DBS or the power system as a whole. In a conventional method, the maximum operation time is a fixed time period that is selected to prevent the components of the DBS from reaching their thermal limits. The fixed time period might be 9 seconds, for example. In the method of the present invention, the maximum operation time can be determined dynamically based on a prevailing temperature of the braking circuit 2, and in particular the prevailing temperature of one or both of the braking resistor 22 and the chopper 24. With reference to FIG. 5, the prevailing temperatures can be estimated accurately using thermal models 30, 32. The thermal model 30 for the chopper 24 uses appropriate inputs 34, e.g., power loss in the chopper, the ambient temperature at the outer case of the chopper, thermal impedance etc., to accurately estimate the junction temperature of the chopper $T_c(t)$ which is then compared in "real time" against an upper temperature threshold $T_{c\_upper}$ for the chopper. Similarly, the thermal model 32 for the braking resistor 22 uses appropriate inputs 36, e.g., power loss in the braking resistor, the ambient temperature at the resistor etc., to accurately estimate the prevailing temperature of the braking resistor $T_r(t)$ which is then compared in "real time" with an upper temperature threshold $T_{r\_upper}$ for the braking resistor. Sensors (not shown) for measuring the various temperatures can be provided as part of the power system. Such sensors can provide the ambient temperatures for use in the thermal models 30, 32.

The upper temperature threshold can be the rated temperature for the respective component, i.e., taken from the manufacturer datasheet, or can be selected to be below the rated temperature to provide a particular thermal margin for the respective component. For example, if the rated temperature of the braking resistor is 1200° C., the upper temperature threshold $T_{r\_upper}$ can be selected to be about 1200° C. or can be selected to be less than 1200° C. (e.g., about 1100° C.) so that operation of the DBS is ended before the rated temperature of the braking resistor 22 is reached or exceeded.

When the prevailing temperature $T_c(t)$, $T_r(t)$ of one of the chopper 24 and the braking resistor 22 reaches or exceeds the respective upper temperature threshold, the operation of the DBS in Step 1 is ended. Operation of the DBS can be ended by controlling the control unit 26 to switch off the chopper 24 or prevent further switch on if the chopper is being controlled using a duty cycle.

The maximum operation time $t_{op}$ for the DBS can be determined by:

$$t_{op}=\min(t_{c\_op}, t_{r\_op})$$

where:
$t_{c\_op}$ is the time taken for the prevailing temperature $T_c(t)$ of the chopper 24 to reach the upper temperature threshold $T_{c\_upper}$, and
$t_{r\_op}$ is the time taken for the prevailing temperature $T_r(t)$ of the braking resistor 22 to reach the upper temperature threshold $T_{r\_upper}$.

If the DBS includes two or more braking circuits, each braking circuit will dissipate a proportion of the output power of the wind turbine generator 8. The operation of the DBS is ended when the prevailing temperature $T_c(t)$, $T_r(t)$ of one of the chopper 24 and the braking resistor 22 in any one of the braking circuits reaches or exceeds the respective upper temperature threshold. In practice, this means that some of the braking circuits might be within acceptable thermal limits when operation of the DBS—and hence operation of all of the braking circuits—is ended.

Simulations indicate that for practical implemented wind turbine generators, the maximum operation time determined dynamically based on a prevailing temperature of the braking circuit can be significantly longer than the fixed operation time currently being used. For example, it may be possible to dissipate 3 MW in one braking circuit 2 using a suitable power shedding profile where the DBS is operated for about 15 seconds without the chopper 24 or the braking resistor 22 of the braking circuit reaching or exceeding an respective upper temperature threshold.

If the prevailing temperature of neither the chopper 24 nor the braking resistor 22 of each braking circuit has reached or exceeded the respective upper temperature threshold, the operation of the DBS in Step 1 can be ended when the output power of the wind turbine generator 8 falls to zero or substantially zero and all of the energy has effectively been dissipated.

Minimum Recovery Time

Once the operation of the DBS in Step 1 has ended, the DBS must normally be allowed a period of time to recover so that it is capable of being operated again if necessary. In a conventional method, the minimum "recovery time" is a fixed time period that is selected to allow the components of the braking circuit, and in particular the braking resistor 22, to cool down sufficiently. The fixed time period might be 20 minutes, for example. During this fixed time period, the wind turbine generator 8 must remain stopped and cannot be used to generate power.

In a first method of the present invention, the wind turbine generator 8 is restarted in Step 3 at its rated output power, i.e., on restarting the wind turbine generator 8 it is ramped up to its rated output power according to a starting sequence. This means that the DBS must be capable of dissipating at least the rated output power of the wind turbine generator 8 and the wind turbine generator cannot be restarted until the braking resistor 22 has cooled sufficiently to provide that capability. It will be readily understood that if the DBS includes two or more braking circuits, each braking circuit must be capable of dissipating its proportion of the rated output power of the wind turbine generator 8.

Instead of using a fixed recovery time, e.g., 20 minutes, the first method of the present invention assumes that the wind turbine generator 8 can be safely restarted when a prevailing temperature $T_r(t)$ of the braking resistor 22 reaches or falls below a lower temperature threshold $T_{r\_lower}$. The lower temperature threshold $T_{r\_lower}$ is selected so that the DBS is capable of safely dissipating a pre-determined output power of the wind turbine generator 8 at a particular duty cycle. The pre-determined output power is at least the rated output power of the wind turbine generator 8 and can be higher than the rated output power for the "worst case" situation described above.

The minimum recovery time $t_{rec}$ for the DBS can be determined by:

$$t_{rec}=t_{r\_rec}$$

where $t_{r\_rec}$ is the time taken for the prevailing temperature $T_r(t)$ of the braking resistor 22 to reach the lower temperature threshold $T_{r\_lower}$. The prevailing temperature $T_r(t)$ of the braking resistor 22 can be accurately estimated using a thermal model as described above.

Figure 6:
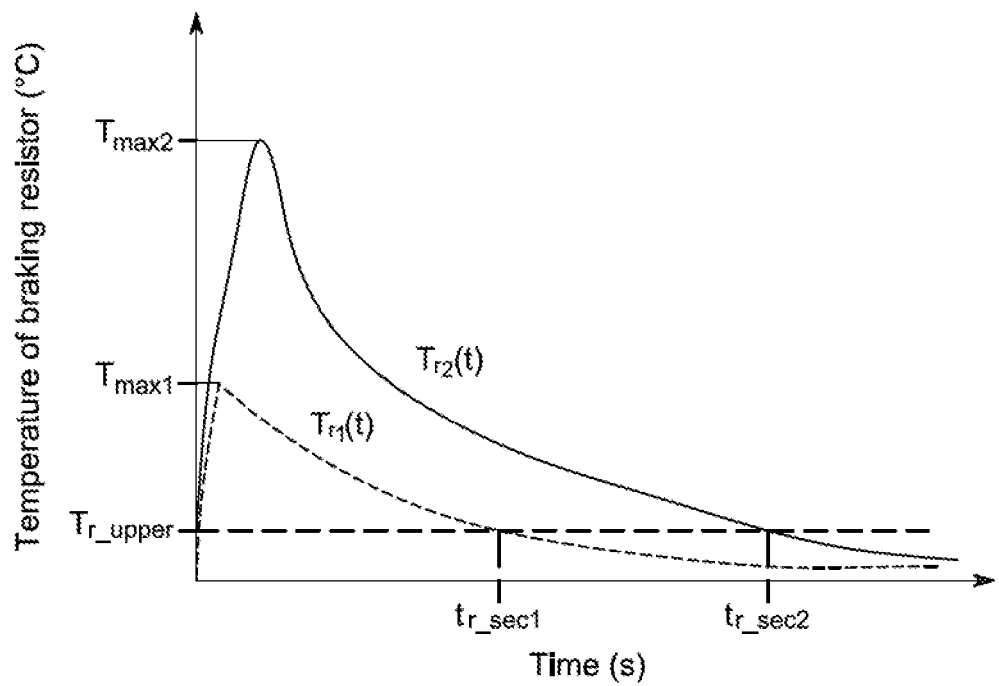
FIG. 6 shows cooling profiles of a braking resistor.

FIG. 6 shows simulated cooling profiles of a braking resistor 22 for two different maximum temperatures $T_{max1}$ and $T_{max2}$ reached during the operation of the DBS in Step 1. The cooling profile will normally depend on the thermal characteristics of the braking resistor (which can be modelled or simulated using an appropriate model) and the ambient temperature of the braking resistor. It can be seen that for the first cooling profile with maximum temperature $T_{max1}$, the prevailing temperature $T_{r1}(t)$ of the braking resistor 22 will reach the lower temperature threshold $T_{r\_lower}$ at time $t_{r\_rec1}$ and for the second cooling profile with maximum temperature $T_{max2}$, the prevailing temperature $T_{r2}(t)$ of the braking resistor will reach the lower temperature threshold $T_{r\_lower}$ at time $t_{r\_rec2}$, where $T_{max2}>T_{max1}$ and $t_{r\_rec2}>t_{r\_rec1}$.

Simulations indicate that for practical implemented wind turbine generators, the minimum recovery time determined dynamically based on a prevailing temperature of the braking circuit, and in particular the braking resistor 22, can be significantly shorter than the fixed recovery time currently being used. In some cases, the DBS might not require any recovery time such that the wind turbine generator 8 can be restarted as soon as the fault in the power network or grid has been cleared and other safety checks have been carried out. In other cases, the minimum recovery time for the DBS determined dynamically based on a prevailing temperature of the braking circuit can be longer than the fixed recovery time. But this avoids a potentially dangerous situation where the wind turbine generator is restarted too soon and where the DBS would not be capable of providing dynamic braking.

If the DBS has two or more braking circuits, the wind turbine generator 8 will normally only be restarted when all of the braking resistors have reached or fallen below their respective lower temperature thresholds.

In a second method, the wind turbine generator 8 is restarted in Step 3 as soon as the fault in the power network or grid has been cleared and other safety checks have been carried out. But instead of restarting the wind turbine generator 8 at its rated output power, i.e., where it is ramped up to its rated output power according to a starting sequence, the wind turbine generator is restarted at an initial, lower, maximum output power that is determined with reference to the prevailing temperature of the braking resistor. The maximum output power of the wind turbine generator 8 is then varied in "real time" based on the prevailing temperature of the braking resistor so that the maximum output power of the wind turbine generator 8 increases as the braking resistor 22 cools down. This means that the wind turbine generator 8 only needs to be stopped for a short period of time—and in particular, a period of time such as 2-3 minutes that is certainly much shorter than the conventional fixed recovery time and is often shorter than the minimum recovery time used in the first method of the present invention where the wind turbine generator 8 is restarted at its rated output power. At any time after the wind turbine generator 8 has been restarted, the DBS can be operated safely at a particular duty cycle because the braking resistor 22 is able to withstand the maximum temperature increase that would result from dissipating the maximum output power of the wind turbine generator that is determined with reference to the prevailing temperature of the braking resistor. In practice, the actual output power of the wind turbine generator 8 can be less than the maximum output power and will depend on the operating conditions, e.g., wind speed.

Figure 7:
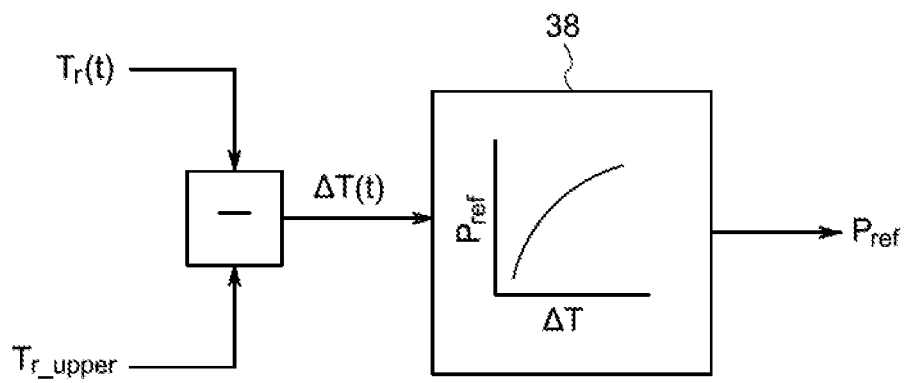
FIG. 7 shows an example of how a power reference for a wind turbine generator can be determined.

With reference to FIG. 7, a temperature difference $\Delta T(t)$ is determined by subtracting the prevailing temperature $T_r(t)$ of the braking resistor 22 from an upper temperature threshold $T_{r\_upper}$ for the braking resistor. The upper temperature threshold can be the rated temperature for the respective component, i.e., taken from the manufacturer datasheet, or can be selected to be below the rated temperature to provide a particular thermal margin. The upper temperature threshold can be the same as the upper temperature threshold for determining the maximum operation time of the DBS in Step 1. Alternatively, different upper temperature thresholds can be used.

A power starting profile 38 uses the temperature difference $\Delta T(t)$ to select a power reference $P_{ref}$ which is used to control the maximum power that the wind turbine generator 8 can output after it is has been restarted. The power reference $P_{ref}$ can be supplied to the wind turbine generator 8 or its controller/regulator (not shown). As the prevailing temperature $T_r(t)$ of the braking resistor 22 decreases, the temperature difference $\Delta T(t)$ will increase and the power reference $P_{ref}$ will increase according to the power starting profile 38 until the wind turbine generator 8 is able to produce the rated output power.

If the DBS has two or more braking circuits, each having a respective temperature difference $\Delta T(t)$, the power starting profile 38 can use one of the temperature differences to select the power reference, e.g., the temperature difference that indicates the lowest capability for a braking circuit to withstand the temperature increase that would result from subsequent operation. Each braking circuit must be capable of dissipating its proportion of the maximum output power of the wind turbine generator 8.

Figure 8:
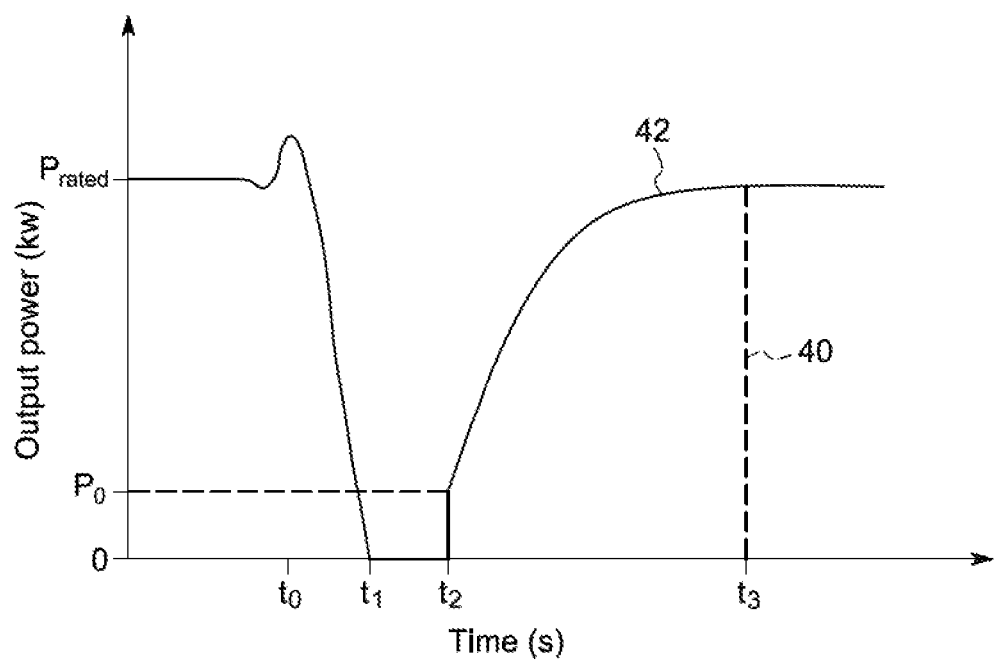
FIG. 8 shows the output power of a wind turbine generator.

The first and second methods are shown graphically in FIG. 8 for a wind turbine generator 8 with rated output power $P_{rated}$. A fault occurs on the power network or grid at time $t_o$ and the DBS is operated to dissipate excess power in the DC circuit as the wind turbine generator 8 is brought to a complete stop at time $t_1$ and the output power is zero. The excess power to be dissipated in the braking resistor 22 is the rated output power $P_{rated}$ of the wind turbine generator 8. If the DBS has two or more braking circuits, the excess power to be dissipated in each braking resistor would be a proportion of the rated output power $P_{rated}$. It is assumed that the operation of the DBS is also ended at time $t_1$ and that the braking resistor 22 then starts to cool down according to a cooling profile—see FIG. 6.

In the first method described above, the wind turbine generator 8 remains stopped until the prevailing temperature $T_r(t)$ of the braking resistor 22 reaches the lower temperature threshold $T_{r\_lower}$ at time $t_3$. The time difference between $t_1$ and $t_3$ is the minimum recovery time $t_{r\_rec}$ for the braking resistor 22. At time $t_3$ the wind turbine generator 8 is restarted and is ramped up to its rated output power $P_{rated}$ according to a starting sequence as indicated by the dashed line 40.

In the second method described above, the wind turbine generator 8 remains stopped until time $t_2$ which is after the fault on the power network or grid has been cleared. At time $t_2$ (which might be 2-3 minutes after $t_1$, for example) the wind turbine generator 8 is restarted and is ramped up to an initial output power $P_0$ (as indicated by the solid line 42) that is determined by the power reference $P_{ref}$ and which represents the maximum power that the wind turbine generator 8 can output for the temperature of the braking resistor 22 at time $t_2$. (FIG. 8 assumes that the wind turbine generator 8 will output the maximum power that it can, i.e., that the prevailing wind conditions allow it to be operated at the limit set by the power reference $P_{ref}$.) As the temperature of the braking resistor 22 decreases, the power reference $P_{ref}$ will increase and the wind turbine generator 8 can output more power to the power network or grid. Eventually, the wind turbine generator 8 will be able to output the rated output power $P_{rated}$ when the braking resistor 22 has cooled sufficiently that the DBS can be operated safely for a "worst case" situation. It can be seen that with the second method, the wind turbine generator 8 can be restarted to generate power much sooner, but at a reduced level.

Figure 9:
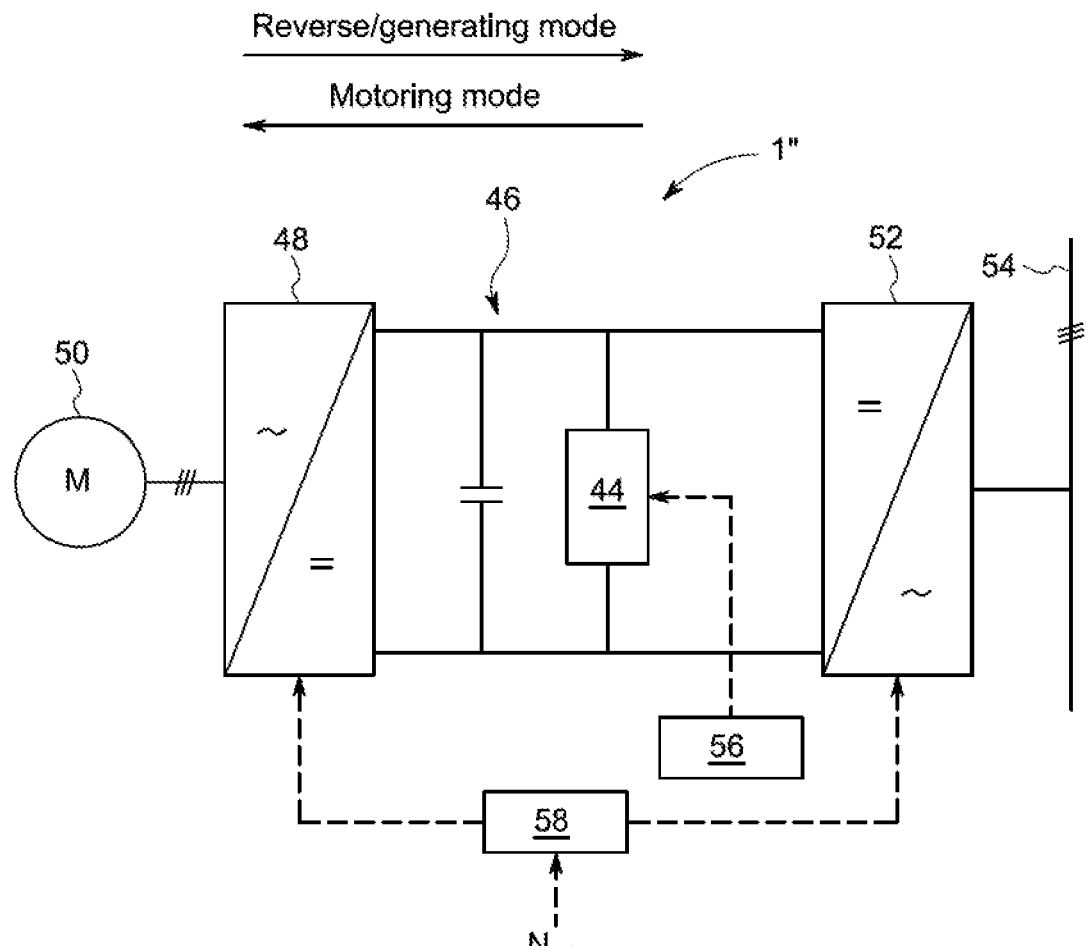
FIG. 9 shows a power system with a variable speed motor and a DBS having one braking circuit.

The present invention provides a method of controlling the power system 1" shown in FIG. 9.

Figure 10:
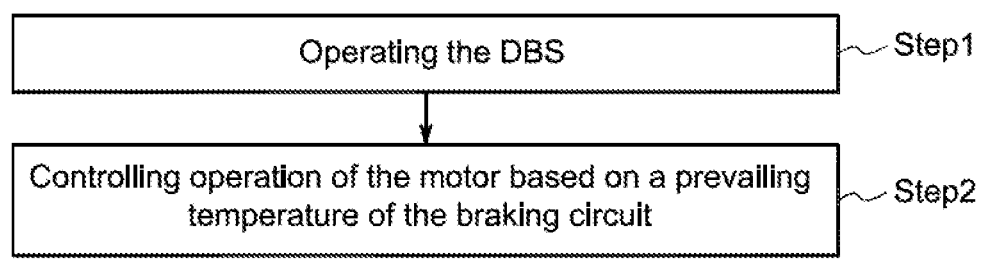
FIG. 10 shows an example of how a speed reference for a variable speed motor can be determined.

With reference to FIG. 10, the method includes the following steps:

Step 1: When the variable speed motor 50 is operating in a generating mode, e.g., during regenerative braking, operating the DBS, e.g., by switching the chopper 24 on and off according to a duty cycle, so that the excess energy in the DC circuit 46 is dissipated as heat in the braking resistor 22.

Step 2: Operating the variable speed motor 50 in a motoring mode and controlling one or more of its operating parameters, e.g., torque, rotational speed, based on a prevailing temperature of the braking circuit 44.

Maximum Operation Time

In Step 1, the DBS is operated for a period of time (the "operation time"). In a conventional method, the maximum operation time is a fixed time period that is selected to prevent the components of the DBS from reaching their thermal limits. In the method of the present invention, the maximum operation time can be determined dynamically based on a prevailing temperature of the braking circuit 44, and in particular the prevailing temperature of one or both of the braking resistor 22 and the chopper 24. As described above, the maximum operation time $t_{op}$ for the DBS can be determined by:

$$t_{op} = \min(t_{c\_op}, t_{r\_op})$$

where:

$t_{c\_op}$ is the time taken for the prevailing temperature $T_c(t)$ of the chopper 24 to reach the upper temperature threshold $T_{c\_upper}$, and $t_{r\_op}$ is the time taken for the prevailing temperature $T_r(t)$ of the braking resistor 22 to reach the upper temperature threshold $T_{r\_upper}$.

Motoring Control

After the DBS has been operated, the variable speed motor 50 can be controlled to operate in a motoring mode. (The motor can also be temporarily stopped and restarted before being operated in a motoring mode, if necessary). While operating in the motoring mode, the input power supplied through the VSD to the variable speed motor 50 can be varied using a control reference such as a speed reference, for example. The input power can be varied in "real time" based on the prevailing temperature of the braking resistor, e.g., so that the rotational speed of the motor 50 increases as the braking resistor 22 cools down. At any time, the DBS can be operated safely at a particular duty cycle because the braking resistor 22 is able to withstand the maximum temperature increase that would result from dissipating the power generated by the motor during a subsequent generating mode.

The prevailing temperature of the braking resistor can be measured, estimated using a thermal model, or otherwise derived as described in more detail above. The maximum rotational speed of the variable speed motor 50 can be determined using a speed profile that relates rotational speed to temperature or temperature difference.

Figure 11:
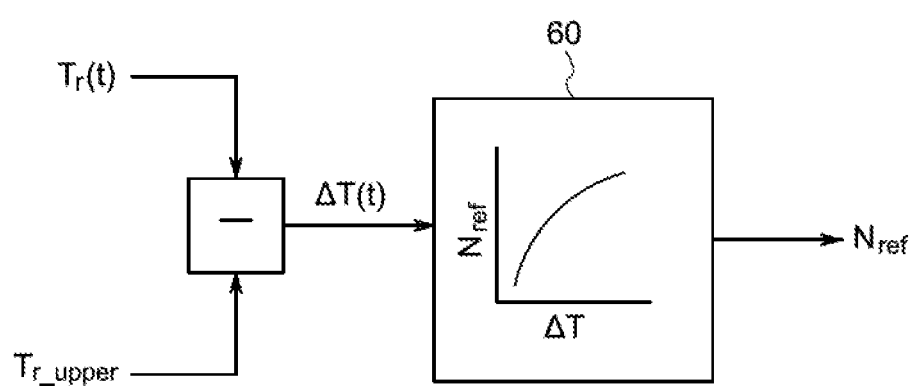
FIG. 11 shows the steps of a method according to the present invention for controlling a variable speed motor.

With reference to FIG. 11, a temperature difference $\Delta T(t)$ is determined by subtracting the prevailing temperature $T_r(t)$ of the braking resistor 22 from an upper temperature threshold $T_{r\_upper}$ for the braking resistor. The upper temperature threshold can be the rated temperature for the respective component, i.e., taken from the manufacturer datasheet, or can be selected to be below the rated temperature to provide a particular thermal margin. The upper temperature threshold can be the same as the upper temperature threshold for determining the maximum operation time of the DBS in Step 1. Alternatively, different upper temperature thresholds can be used.

A speed profile 60 uses the temperature difference $\Delta T(t)$ to select a speed reference $N_{ref}$ which is used to control the input power supplied to the variable speed motor 50 through the VSD and hence control the rotational speed of the motor. As the prevailing temperature $T_r(t)$ of the braking resistor 22 decreases, the temperature difference $\Delta T(t)$ will increase and the speed reference $N_{ref}$ will increase according to the speed profile 60 until the motor is able to run at the rated speed or the speed selected by the VSD depending on the operating requirements of the power system.

The speed reference $N_{ref}$ is provided to the controller 58 for the VSD where it can be used as part of a control strategy to vary the input power to the motor 50 by controlling the semiconductor switches of the power converters 48, 52. Such control strategies are well known to the skilled person and might, for example, use pulse width modulation (PWM) or any other appropriate control. Other control references/profiles can be used to achieve the desired control of the variable speed motor 50 during the subsequent motoring mode based on the prevailing temperature $T_r(t)$ of the braking resistor 22.

If the DBS has two or more braking circuits, each having a respective temperature difference $\Delta T(t)$, the speed profile 60 can use one of the temperature differences to select the speed reference, e.g., the temperature difference that indicates the lowest capability for a braking circuit to withstand the temperature increase that would result from subsequent operation. Each braking circuit must be capable of dissipating its proportion of the power generated by the variable speed motor 50 if it is operated in generating mode, e.g., during regenerative braking.

What we claim is:

1. A method of controlling a power system comprising an electrical machine, a power converter including AC terminals connected to the electrical machine and DC terminals, a DC circuit connected to the DC terminals of the power converter, and a dynamic braking system comprising a braking circuit connected in series to the DC circuit, the braking circuit including a braking resistor and a chopper; the method comprising:

in an event of a fault, operating the dynamic braking system for a maximum operation time to dissipate any excess energy in the DC circuit, wherein the maximum operation time is dynamically adjusted as a prevailing temperature of the braking circuit varies; and controlling operation of the electrical machine by stopping operation of the electrical machine until the fault is cleared and restarting the electrical machine dependent upon an acceptable level of the prevailing temperature of the braking circuit.

2. The method according to claim 1, wherein dynamically adjusting of the maximum operation time includes operating the dynamic braking system and comparing the prevailing temperature of the braking circuit in real time against an upper temperature threshold of the braking circuit until the prevailing temperature of the braking circuit reaches or exceeds the upper temperature threshold.

3. The method according to claim 1, wherein the controlling step includes restarting the electrical machine when the prevailing temperature of the braking circuit reaches or falls below a lower temperature threshold.

4. The method according to claim 3, wherein the prevailing temperature of the braking circuit is the prevailing temperature of the braking resistor.

5. The method according to claim 4, wherein the lower temperature threshold is selected to allow the dynamic braking system to dissipate a pre-determined output power of the electrical machine.

6. The method according to claim 5, wherein the pre-determined output power is at least the rated output power of the electrical machine.

7. The method according to claim 1, wherein the controlling step includes restarting the electrical machine after a period of time at a low maximum output power and, after restarting, varying the maximum output power of the electrical machine by increasing the maximum output power as the prevailing temperature of the braking circuit decreases.

8. The method according to claim 7, wherein the maximum output power of the electrical machine is varied as the prevailing temperature of the braking resistor varies wherein the prevailing temperature of the braking resistor is compared in real time against an upper temperature threshold of the braking resistor.

9. The method according to claim 7, wherein the maximum output power of the electrical machine corresponds to a power starting profile determined using a temperature difference of the braking circuit to select a power reference to control the maximum output power for restarting the electrical machine.

10. The method according to claim 9, wherein the power starting profile relates the maximum output power of the electrical machine to a temperature difference between the prevailing temperature of the braking resistor and an upper temperature threshold of the braking resistor.

11. The method according to claim 1, wherein the controlling step includes controlling one or more of the operating parameters of the electrical machine.

12. The method according to claim 11, wherein the electrical machine is operated as a motor during the controlling step.

13. A power system comprising:
an electrical machine;
a power converter including AC terminals connected to the electrical machine and DC terminals;
a DC circuit connected to the DC terminals of the power converter;

a dynamic braking system comprising a braking circuit connected in series to the DC circuit, the braking circuit including a braking resistor and a chopper; and a control unit adapted to:
- in an event of a fault, operate the dynamic braking system for a maximum operation time to dissipate any excess energy in the DC circuit, wherein the maximum operation time is dynamically adjusted as a prevailing temperature of the braking circuit varies; and
- control operation of the electrical machine by stopping operation of the electrical machine until the fault is cleared and restarting the electrical machine dependent upon an acceptable level of the prevailing temperature of the braking circuit.

14. The power system according to claim 13, wherein the electrical machine is a wind turbine generator whose rotor is driven to rotate by a rotor assembly including one or more rotor blades or a variable speed motor.

* * * * *